US009934643B2

(12) United States Patent
Neuhauser et al.

(10) Patent No.: US 9,934,643 B2
(45) Date of Patent: Apr. 3, 2018

(54) METHOD FOR PROCESSING VALUE DOCUMENTS AND MEANS FOR PERFORMING THE METHOD

(71) Applicant: GIESECKE & DEVRIENT GMBH, Munich (DE)

(72) Inventors: Richard Neuhauser, Munich (DE); Ralf Hobmeier, Munich (DE)

(73) Assignee: GIESECKE+DEVRIENT CURRENCY TECHNOLOGY GMBH, Munich (DE)

(*) Notice: Subject to any disclaimer, the term of this patent is extended or adjusted under 35 U.S.C. 154(b) by 15 days.

(21) Appl. No.: 14/653,338

(22) PCT Filed: Dec. 18, 2013

(86) PCT No.: PCT/EP2013/003829
§ 371 (c)(1),
(2) Date: Jun. 18, 2015

(87) PCT Pub. No.: WO2014/095054
PCT Pub. Date: Jun. 26, 2014

(65) Prior Publication Data

US 2016/0189465 A1 Jun. 30, 2016

(30) Foreign Application Priority Data

Dec. 20, 2012 (DE) ........................ 10 2012 025 084

(51) Int. Cl.
*G06K 7/00* (2006.01)
*G07D 11/00* (2006.01)

(52) U.S. Cl.
CPC ..... *G07D 11/0084* (2013.01); *G07D 11/0006* (2013.01); *G07D 11/0012* (2013.01); *G07D 11/0066* (2013.01)

(58) Field of Classification Search
USPC ........ 235/375, 379, 380, 435, 439, 454, 462
See application file for complete search history.

(56) References Cited

U.S. PATENT DOCUMENTS 6,065,672 A * 5/2000 Haycock ............ G07D 11/0009 235/379
7,487,909 B2 2/2009 Eberhardt et al.
(Continued)

FOREIGN PATENT DOCUMENTS

DE 19824435 A1 12/1999
DE 10155731 A1 6/2003
(Continued)

OTHER PUBLICATIONS

German Search Report from corresponding German Application DE102012025084.3, dated Aug. 6, 2013.
(Continued)

*Primary Examiner* — Matthew Mikels
(74) *Attorney, Agent, or Firm* — Workman Nydegger

(57) ABSTRACT

Described is a method for processing value documents which have an individual identifier, for example a serial number, in which for the value documents the individual identifier is respectively captured and from at least a part of the value documents a stack is formed, wherein for the stack the individual identifiers of the value documents of the stack are stored as belonging to a stack, for the stack there are captured usage data with the help of which the usage of the stack is identifiable and identifier data describing the individual identifier of at least one value document of the stack, and using the identifier data, the usage data and the individual identifiers of the value documents of the stack, which were stored as belonging to a stack, are stored so as to be associated with each other.

20 Claims, 1 Drawing Sheet

(56) References Cited

U.S. PATENT DOCUMENTS

| | | | | |
|---|---|---|---|---|
| 8,588,961 | B2 | 11/2013 | Goltz | |
| 2004/0016034 | A1 * | 1/2004 | Calder | G07D 11/0096 235/379 |
| 2005/0207634 | A1 * | 9/2005 | Jones | G06Q 20/18 382/135 |
| 2006/0212372 | A1 | 9/2006 | Eberhard et al. | |
| 2007/0040014 | A1 * | 2/2007 | Zhao | G06Q 20/108 235/379 |
| 2008/0061127 | A1 | 3/2008 | Brexel | |
| 2011/0042178 | A1 | 2/2011 | Luecking | |
| 2011/0315760 | A1 * | 12/2011 | Ito | G07D 11/0021 235/375 |
| 2012/0191239 | A1 | 7/2012 | Goltz | |

FOREIGN PATENT DOCUMENTS

| | | | |
|---|---|---|---|
| DE | 10329321 | A1 | 1/2005 |
| DE | 102005049064 | A1 | 4/2007 |
| DE | 102008020208 | A1 | 10/2009 |
| DE | 102009035028 | A1 | 2/2011 |
| EP | 2479729 | A1 | 7/2012 |
| WO | 2006063555 | A1 | 6/2006 |
| WO | 2007061377 | A1 | 5/2007 |

OTHER PUBLICATIONS

International Search Report from corresponding PCT Application No. PCT/EP2013/003829, dated Apr. 9, 2014.

International Preliminary Report on Patentability from corresponding PCT Application No. PCT/EP2013/003829, dated Jun. 23, 2015.

* cited by examiner

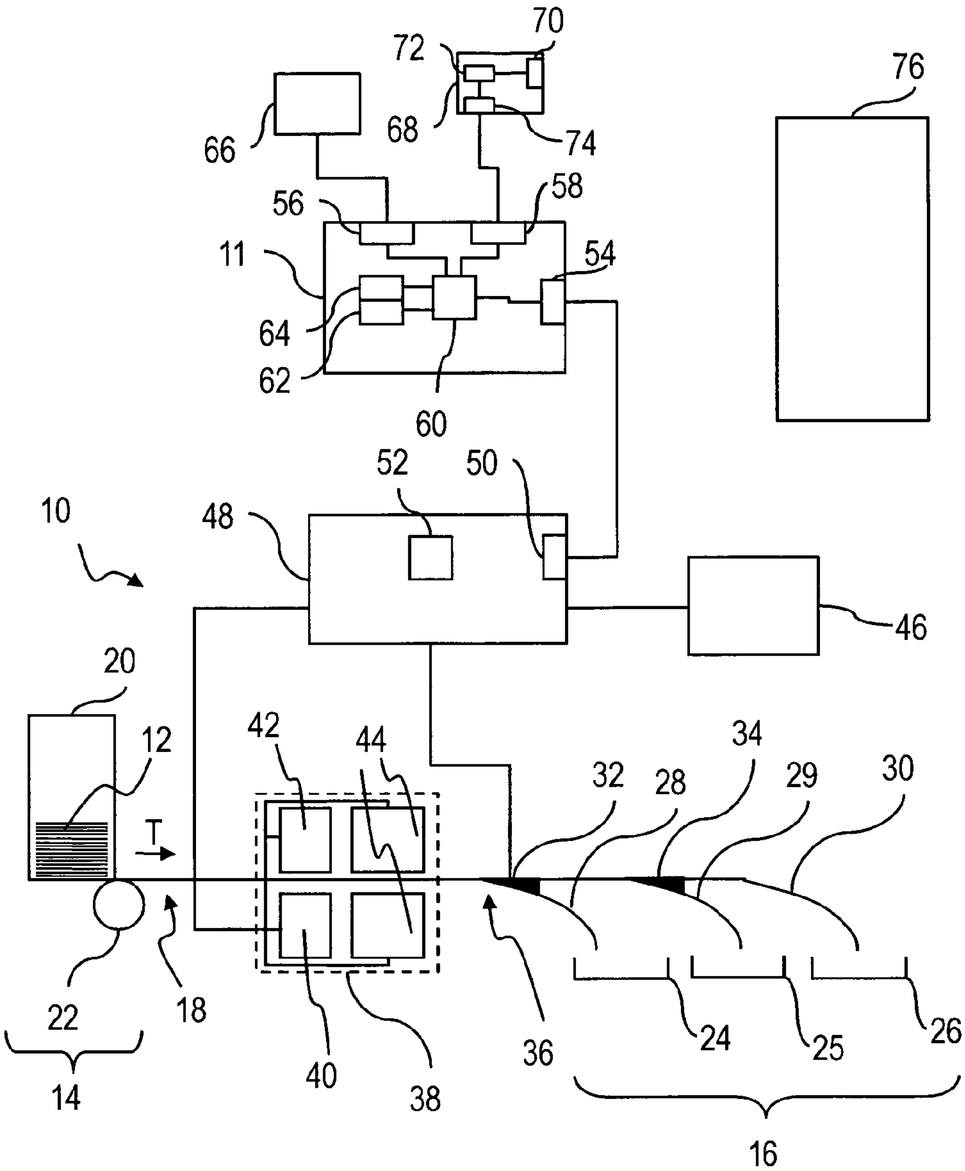
70
72
76
66
68
74
56
58
11
54
64
62
60
52
50
10
48
46
20
12
T
42
44
34
32
28
29
30
22
18
36
24
25
26
40
38
14
16

METHOD FOR PROCESSING VALUE DOCUMENTS AND MEANS FOR PERFORMING THE METHOD

BACKGROUND

The present invention relates to a method for processing value documents and means for carrying out the method.

In this context, value documents are understood to mean sheet-shaped objects, which represent for example a monetary value or an authorization and thus shall not be manufacturable at will by unauthorized persons. Therefore, they have features not easy to manufacture, in particular to copy, whose presence is an indication of the authenticity, i.e. the manufacturing by a body authorized thereto. Important examples of such value documents are coupons, vouchers, checks and in particular bank notes.

Value documents may have, depending on the type, an individual identifier. An individual identifier within the framework of the present invention is understood to mean a machine-readable property distinguishing the individual value document from other value documents, also of the same type, which allows an unequivocal identification of the individual value document and a secure differentiation from other value documents. In the case of value documents in the form of banks notes, such an individual identifier can be a serial number of the bank note. In the case of checks a check number, where applicable, in connection with account data.

Value documents, in particular banks notes, are often checked by machine and sorted into stacks, in order to then fill them into containers, for example cassettes or boxes, which do not necessarily need to be completely closed. Then the containers are employed, for example, for the distribution of the banks notes or for the usage of the banks notes in automatic teller machines. It would often be desirable if it could be determined, also after the filling of a cassette with such value documents having individual identifiers, which value documents were filled into the cassettes. Similar requirements may arise for other usages of stacks with value documents having individual identifiers.

SUMMARY

Hence, the invention is based on the object of providing a method for processing value documents having an individual identifier, which enables the individual identifiers of value documents of a stack of value documents, which are supplied to a certain usage, to be easily ascertained, as well as to state means for carrying out the method.

In particular the object is achieved by a method for processing value documents which have an individual identifier, for example a serial number, in which for the value documents the individual identifier is respectively captured and from at least a part of the value documents a stack is formed, wherein for the stack the individual identifiers of the value documents of the stack are stored as belonging to a stack, for the stack there are captured usage data with the help of which the usage of the stack is identifiable and identifier data describing the individual identifier of at least one value document of the stack, and using the identifier data, the usage data and the individual identifiers of the value documents of the stack, which were stored as belonging to a stack, are stored so as to be associated with each other.

The object is further achieved by a computer program with program code, upon the execution of which by a data processing device having a memory device and interfaces for capturing individual identifiers of value documents, which are transmitted as belonging to a stack, usage data with the help of which the usage of the stack is identifiable, and identifier data which describe an individual identifier of a value document, upon the execution of which by the data processing device individual identifiers supplied as belonging to a stack are stored as belonging to a stack, the usage data and the identifier data are captured and, using the identifier data, the usage data and the individual identifiers of the value documents of the stack, which were stored as belonging to a stack, are stored so as to be associated with each other.

The object is further achieved by a data processing device with a memory device, interfaces for capturing individual identifiers of value documents, which are transmitted as belonging to a stack, usage data with the help of which the usage of the stack is identifiable, and identifier data which describe an individual identifier of a value document, which is configured to store individual identifiers, supplied as belonging to a stack, as belonging to a stack, to capture the usage data and the identifier data and, using the identifier data, to store the usage data and the individual identifiers of the value documents of the stack, which were stored as belonging to a stack, so as to be associated with each other. In particular, the object is achieved by a data processing device having a memory device, interfaces for capturing individual identifiers of value documents, which are transmitted as belonging to a stack, at least a part of usage data with the help of which the usage of the stack is identifiable, and identifier data which describe an individual identifier of a value document, and a memory in which a computer program of the invention is stored so that this can be executed by means of the data processing device.

In the method of the invention, at first the individual identifiers of value documents, from which a stack is formed, are captured. For this purpose, there can in particular be used an apparatus for processing value documents having an individual identifier, which has a feeding device for feeding value documents, an output device for outputting processed value documents, which has at least pocket for a stack of processed value documents, a transport device for transporting singled value documents along a transport path from the feeding device to the output device, at least one sensor device arranged at the transport path for capturing the individual identifier of a transported value document, and a control and evaluation device which is configured to capture the individual identifiers of the value documents stacked in the output pocket. The individual identifiers can first be stored in a memory device of the value document processing apparatus and, where applicable, transmitted to the data processing device later, but it is also possible that the data are transmitted to the data processing device during the formation of the stack.

The data processing device can be configured separate from the value document processing apparatus, i.e. detached as an independent apparatus, but it is also possible that the data processing device forms a part of the value document processing apparatus, it being possible that it is partially integrated with the control and evaluation device, for example the two devices can have a common processor. The subject matter of the invention is hence also an apparatus for processing value documents having an individual identifier, with a feeding device for feeding value documents, an output device for outputting processed value documents, which has at least pocket for a stack of processed value documents, a transport device for transporting singled value documents along a transport path from the feeding device to the output device, at least one sensor device arranged at the transport path for capturing the individual identifier of a transported value document, and a control and evaluation device which is configured to capture the individual identifiers of the value documents stacked into the output pocket, and a data processing device of the invention, whose interface for capturing individual identifiers is connected with a corresponding interface of the control and evaluation device, so that the individual data which are stored as belonging to a stack can be transmitted via this interface. In doing so, the control and evaluation device may capture the individual identifier of the value documents stacked in the output pocket using corresponding sensor data, preferably data representing the individual identifier, formed by sensor device as a result of the capturing of the individual identifier of a respective value document.

The data processing device can be designed as a local computer or as a system of networked computers provided locally or at several locations. In the latter case, the program code can then be distributed on the various computers, each of the computers being required to execute only parts of the program code, where applicable.

In principle it is sufficient that only at least a stack of loose value documents is formed, but it is also possible that the apparatus has a banding device for banding the stack or the value documents of the stack. Then the formed stacks can also be banded.

Storing the individual identifiers as belonging to a stack can be effected for example by storing them only together, for example as a list, preferably chained list, but it is also possible to assign a stack identifier to the individual identifiers, which identifies the stack. Other alternatives are also conceivable.

Now the stack can be fed to a usage. Before, during, or after, preferably immediately after the feeding to the usage, usage data as well as the identifier data for at least one of the value documents of the stack are captured. With the help of the usage data the usage of the stack is identifiable; the usage data can in particular be chosen such that by means of the usage data the usage is unambiguously describable and/or is distinguishable from other specified possible usages. The identifier data are here selected such that the individual identifier of the value document is ascertainable from these.

Using the identifier data, the usage data and the individual identifiers of the value documents of the stack, which were stored as belonging to a stack and also contain the individual data corresponding to the identifier data, are then stored so as to be associated with each other.

This procedure has the advantage that it is unnecessary to mark the stack in more detail for allowing a later determination as to which value documents were fed to which usage. Only the already present properties of a value document of the stack are used. Hence, the method is especially easy to carry out.

Basically, the stack can be arbitrarily used. It is merely necessary that a usage can be unambiguously marked by the usage data. In a preferred embodiment, the usage data comprise a container identifier of a container for value documents, preferably of a security container, in which the stack is or was loaded, and preferably at least one date at which the stack is or was loaded in the container. Accordingly, the computer program and the data processing device are configured such that the usage data comprise a container identifier of a container for value documents, preferably of a security container, in which the stack is or was loaded and preferably at least one date at which the stack is or was loaded in the container. The date, preferably also in connection with the time, allows that in case a container is used several times the usage data are formed in a simple but informative form. The feature that the usage data comprise the date and preferably also the time of the usage of the value documents of the stack is also preferred for other usages of value document stacks.

In this embodiment it is particularly preferred that in the method at least a part of the usage data, for example from the container for value documents, preferably the security container, are read or transmitted via a wired or wireless interface. The computer program is then preferably designed for the usage with a data processing device having a wired or wireless interface for at least a part of the usage data. In the data processing device, the interface for at least a part of the usage data is then preferably a wired or wireless interface. Upon execution of the computer program, at least a part of the usage data, for example from the container for value documents, preferably the security container, can then be read or received via the wired or wireless interface. Preferably, in the case of a usage with a container for value documents, preferably a security container, the container may have an electrical or electronic circuit which is readable in wireless or wired fashion, in particular an RFID chip, which can be read via the interface. The circuit may particularly preferably comprise the container identifier which distinguishes the container unambiguously from others and serves at least as a part of the usage data.

However, in other embodiments it is also possible that the usage data are captured at least partially via an input device connected with the data processing device via the respective interface for capturing at least a part of the usage data. The computer program and the data processing device are then configured such that usage data are captured by means of an input device connected with the data processing device via the interface for capturing at least a part of the usage data.

The identifier data can be captured in principle arbitrarily. In particular it is preferred that the identifier data comprise as an individual identifier only the individual identifier of only one value document of a stack, but not those of several value documents. In principle, it is sufficient that the individual identifier is ascertainable from the identifier data. The identifier data may comprise, for example, a digital image of a portion of the value document having the individual identifier. Preferably, the identifier data are the individual data, however. The kind of capturing may depend on the kind of identification data.

It is possible according to an embodiment that in the method the identifier data are captured by means of an input device for the manual input of identifier data. Preferably, the computer program is then provided or written for a data processing device having an input device for the manual input of identifier data, and upon the execution thereof the identifier data are captured by means of an input device for the manual input of identifier data. The input device and the respective interface may preferably also be configured for capturing usage data. This embodiment is suitable in particular for identification data in the form of an individual identifier that is formed by an alphanumeric character string.

Alternatively or additionally, it is preferred that in the method the identifier data are captured by means of a reading device, preferably a hand-held reading device. The computer program is then configured such that the interface of the data processing device is configured for capturing the identifier data from a reading device, preferably a hand-held reading device, and that upon the execution thereof the identifier data are read via the interface from the reading device. The reading device may be configured, depending on the kind of identifier data, for example as a simple device for capturing an image of a portion of the value document having the individualization identifier, for example as a camera with an interface for the transmission to the interface of the data processing device. But it is preferred that the reading device is configured such that as identifier data it captures the individual identifiers and transfers these via the interface. For this purpose, it may have, in the case of individual identifiers in the form of alphanumeric character strings, for example serial numbers of banks notes, a device for recognizing alphanumeric character strings, for example an accordingly programmed processor. The subject matter of the invention is hence also a hand-held reading device for capturing an individual identifier of a value document with an interface for transmitting the individual identifier as identification data.

Alternatively or additionally, it is possible that in the method the identifier data comprise image data for an image of the individual identifier, and the individual identifier is ascertained from the identifier data by means of a data processing device in which the usage data and the individualization data are stored and/or are being stored. The computer program can then preferably be configured such that the identifier data comprise image data for an image of the individual identifier and that upon the execution thereof by the data processing device the individual identifier is ascertained from the identifier data. The data processing device can then preferably have a processor and/or program code upon the execution of which the individual identifier is ascertained from the identifier data. This embodiment has the advantage that the hand device can be particularly simply constructed. For example, it can be a simple camera with an interface for the transmission of image data.

Storing the usage data and the individual identifier corresponding to the identifier data in a fashion so as to be associated with each other can be effected in an in principle arbitrary way. According to a preferred embodiment, in the method, for various further stacks it is possible that individual identifiers are respectively stored as belonging to a stack, and for storing the usage data, the individual identifier corresponding to the identifier data can be searched for in the individual identifiers for the stack and the further stacks, which are stored as belonging to a stack. The computer program can then preferably be configured such that upon the execution thereof, when for various further stacks individual identifiers are respectively stored as belonging to a stack, for storing the usage data, the individual identifier corresponding to the identifier data are searched for in the individual identifiers for the stack and the further stacks, which are stored as belonging to a stack. This allows a secure and simple finding of the individual identifiers of the respective stack. The usage data and the individual identifiers stored as belonging to a stack can then be stored so as to be associated with each other.

Storing the individual identifiers, stored as belonging to a or the stack, and the usage data so as to be associated with each other is understood to mean that data are stored such that with a specified method there can be ascertained which usage data are associated with one of the individual identifiers and which individual data are associated with a usage or specified usage data.

Preferably, in the method, the individual identifiers of those value documents whose individual identifiers are stored as belonging to the same stack and which include the individual identifier described by the identifier data and the usage data can be stored so as to be directly associated with each other. For this purpose, the computer program can preferably be configured such that upon the execution thereof the individual identifiers of those value documents whose individual identifiers are stored as belonging to the same stack and which include the individual identifier described by the identifier data and the usage data are stored so as to be directly associated with each other. Particularly preferably, for this purpose, the already stored individual identifiers can be used to which only the usage data are to be stored so as to be associated. This kind of storage is particularly simple.

However, it is also possible that, in the method, the usage data and only the captured individual identifier of the value document are stored so as to be associated with each other. Ascertaining the individual data stored as belonging to the stack can be effected by, as described above for finding these individual identifiers, the captured individual identifier being searched for in the individual identifiers stored as belonging to a stack. The computer program can then preferably be configured such that the usage data and only the captured individual identifier of the value document are stored so as to be associated with each other. This alternative allows a very quick storage of the usage data.

In the method it is further possible that the usage data and a stack identifier identifying the stack are stored so as to be associated with each other, the individual identifiers stored as belonging to a stack having respectively associated therewith a stack identifier.

The concrete kind of storage is arbitrary, but the use of a data base is preferred.

The data stored with the method of the invention do not only permit that in a simple way, namely by capturing usage data to be searched and searching for the usage data, the individual identifiers stored as belonging to a stack and to be associated with these usage data are ascertained. Vice versa, it is also possible to ascertain the usage of a value document in a simple way. The subject matter of the present invention is also a method for identifying the usage of a value document with an individual identifier, in which the individual identifier is read in and searched for among the individualization identifiers that are associated with usage data, stored as belonging to a stack and stored by means of a processing method of the invention, and, if the individual identifier is found, associated usage data are ascertained. Then these can preferably be output via a suitable output device or interface.

The subject matter of the invention is also a data carrier that is readable by means of a data processing device, with a computer program of the invention stored thereon or therein. In this context, the data carrier is an object, on or in which the computer program is stored, for example an optical data carrier or a data carrier with an electronic memory, for example a flash memory. Other forms of data carriers are also possible, for example hard discs or the like.

BRIEF DESCRIPTION OF THE DRAWINGS

The invention will hereinafter be explained further by way of example with reference to the drawings. The only FIGURE shows a schematic view of a value document processing apparatus with a detached data processing device.

DETAILED DESCRIPTION OF VARIOUS EMBODIMENTS

A system for value document processing in the only FIGURE comprises a value document processing apparatus

10, in the example an apparatus for processing value documents 12 in the form of banks notes having serial numbers, and an external data processing device 11. The value document processing apparatus is configured for sorting value documents in dependence on the recognition of authenticity and state of processed value documents. The components of the apparatus described in the following are arranged in a housing (not shown) of the apparatus or are held at this, unless they are referred to as external. The data processing device 11 is arranged external and detached from the value document processing apparatus.

The apparatus 10 has a feeding device 14 for feeding value documents, an output device 16 for receiving processed, i.e. sorted, value documents, and a transport device 18 for transporting singled value documents from the feeding device 14 to the output device 16.

The feeding device 14 comprises, in the example, an input pocket 20 for a value-document stack and a singler 22 for singling value documents out of the value-document stack in the input pocket 20 and for feeding the singled value documents to the transport device 18.

The output device 16 comprises, in the example, three output portions 24, 25 and 26 into which processed value documents can be sorted, sorted according to the result of the processing. In the example, each of the portions comprises a stack pocket and a stacking wheel (not shown) by means of which fed value documents can be deposited in the respective stack pocket.

The transport device 18 has at least two, in the example three, branches 28, 29 and 30 at whose ends one of the output portions 24 or 25 or 26 is respectively disposed, and, at the branching points, gates 32 and 34 controllable by actuating signals for feeding value documents to the branches 28 to 30 and thus to the output portions 24 to 26 in dependence on actuating signals.

On a transport path 36, defined by the transport device 18, between the feeding device 14, in the example more precisely the singler 22, and the first gate 32 after the singler 22 in the transport direction there is disposed a sensor device 38 which measures physical properties of the value documents when value documents are being transported past, and forms sensor signals representing the measurement results. In this example, the sensor device 38 has three sensors, namely two optical remission sensors 40 and 42 arranged on opposing sides of the transport path 36, which capture a remission color image and a remission IR image of a corresponding side of the value document, respectively, and a transmission ultrasonic sensor 44 which captures or measures ultrasound transmission properties of the value document in a spatially resolved manner and will hereinafter only be designated as an ultrasonic sensor for simplicity's sake. The sensor signals formed by the sensors correspond to measuring data of the sensors, which depending on the sensor could already have been subjected to a correction, for example in dependence on calibrating data and/or noise properties.

For displaying operating data and for capturing operating data of a user, the value document processing apparatus 10 has an input/output device 46 which is realized in the example by a touch-sensitive display device ("touch screen").

A control and evaluation device 48 has data interfaces, not shown in the FIGURE, by means of which it is connected via signal connections with the sensor device 38, the display device 46 and the transport device 18, in particular the gates 32 and 34. Further, the control and evaluation device 48 has a data interface 50 by means of which the control and evaluation device 48 can transmit data records to the external data processing device 11 or by means of which the external data processing device 11 can read data records. In the present example, the data interface 50 has an Ethernet network interface.

The control and evaluation device 48 displays operational data by means of the input/output device 46 and captures user inputs thereby, whereupon it controls the apparatus 10 accordingly.

The control and evaluation device 48 is further configured, among other things, to evaluate the sensor signals of the sensor device 38, to thereby ascertain an authenticity class and a state class for a respective value document, and to control the transport device 18 in dependence on the ascertained classes in such a way that the value documents are sorted and stacked in an output pocket corresponding to the classes.

Further, the control and evaluation device 48 is configured to ascertain from the sensor signals of the sensor device 38, more precise from their remission sensors, an individual identifier of a respective value document in the form of the serial number of the value document.

The control and evaluation device 48 has a memory device 52, in which for each of the stack pockets the ascertained individual identifiers of the value documents sorted into the stack pocket can be stored as belonging to a stack.

The control and evaluation device 48 is configured such that commencing with the capturing of a corresponding signal of the input/output device, which is triggered by a user or in other embodiments with insertion of a stack into the feeding device, upon the processing of value documents, for at least one, in the example everyone of the stack pockets the previously ascertained individual identifiers of the value documents stacked in the respective stack pocket are stored as belonging to a stack in the data memory 52.

For carrying out the mentioned functions, the control and evaluation device 48 has a memory, not shown in the FIGURE, in which program code is stored, and a processor connected via signal connections with the interfaces, the memory and the memory device 52. Upon execution of the program code by the processor, the control and evaluation device executes the mentioned functions.

The external data processing device 11 has an interface 54, which corresponds to the interface 50, for capturing individual identifiers stored as belonging to a stack in the value document processing apparatus 10, in this embodiment the memory device 52. The interface 54 accordingly also configured as an Ethernet interface is connected via a LAN with the interface 50.

The data processing device 11 further has an interface 56 for capturing usage data and an interface 58 for capturing identifier data of a value document. Both interfaces are designed as USB interfaces in this embodiment.

The data processing device 11 is configured to execute hereinafter described parts of a method for processing value documents, for the purpose of which it has in this embodiment a processor 60 connected with the interfaces 54, 56 and 58, a memory portion 62 for storing a computer program executable by the processor 60, as well as a memory portion 64 for processing data. Upon execution of the program by the processor, the data processing device 11 executes the parts of the method which are mentioned above and hereinafter described in more detail. In this embodiment, the memory portions 62 and 64 are memory regions of only one memory, in other embodiments they can be given by separated memory modules.

To the interface 56 there is coupled, as a reading device for at least a part of usage data, a bar code reader 66, which upon the capture of a bar code outputs an alphanumeric character string, represented by the bar code, via its USB connection.

A reading device 68 for identifier data of a value document is coupled to the interface 68. As a reading device 68 there is provided, in this embodiment, a reading device configured as a hand device which has a camera portion 70 for generating image data of a digital image, an OCR device 72 for recognizing an alphanumeric individual identifier in a digital image recorded by means of the camera portion 70 based on the image data, and an interface 74 connected with the OCR device 72, in the example a USB interface. The OCR device 72 can be given, for example, by a processor and a memory in which there can be given program code, which is executable by the processor, for recognizing characters, in the example alphanumeric characters. The interface 74 is connected via a corresponding cable with the interface 58.

The described system is provided, among other things, for filling security containers 76 with value documents from the stack pockets. Each of the employed security containers 76 has a bar code representing container identifier unequivocally marking the individual security container and unequivocally marking the security container, which bar code is capturable by means of the reading device 66.

The following method for processing value documents can be carried out with the system.

At the beginning of the processing the output portions or stack pockets of the value document processing apparatus 10 are empty. By means of the input/output device 46 the control and evaluation device 48, on the one hand, captures a start signal, upon which it creates for each of the stack pockets in the memory device 52 a list for individual identifiers, which first is empty. On the other hand, it controls the feeding device 14 and the transport device 18 in such a way that the feeding device 14 feeds value documents inserted in the feeding device 14 in singled fashion to the transport device 18 and the transport device 18 transports the value documents singly past or through the sensor device 38; in doing so, the sensor device captures corresponding physical properties and forms sensor signals describing these, which the control and evaluation device 48 receives. In other embodiments, the control and evaluation device 48 can also capture a different start signal, for example from the feeding device 14, when this determines by means of a suitable sensor that value documents are located in the input pocket 20.

The control and evaluation device 48 evaluates the sensor signals. In doing so, it ascertains, on the one hand, for every value document the individual identifier thereof using the remission image data captured by the sensor device 38, for at least one side, preferably both sides of the value document. On the other hand, it ascertains, using the sensor signals, an authenticity class and a state class for the value document and controls the transport device 18 in such a way that the value document is transported into an output portion associated with the authenticity class and state class or the stack pocket thereof. Further, it stores the ascertained individual identifier as belonging to the respective stack in the list associated with the respective stack pocket in the memory 52.

When the feeding of value documents is completed, in the memory 52 there are thus stored for each stack pocket individual identifiers stored as belonging to a stack, which belong to the value documents belonging to the respective stack pocket. Hence, for various stacks individual identifiers are respectively stored as belonging to a stack.

Upon a corresponding signal of the value document processing apparatus 10 via the interface 50, the data processing device 11 now reads by means of its interface 54, separately for each of the stack pockets, the individual identifiers stored as belonging to a stack and respectively stores these in the memory portion 64, for example again as a list.

Now, a user can remove from one of the stack pockets a stack of value documents and load it into the security container 76. In doing so, the user captures the bar code on the security container 76, and thus the container identifier, with the reading device 66. Further, he captures with the reading device 68 the individual identifier as identifier data, here the serial number, of the uppermost value document of the stack.

The data processing device 11 captures via the interface 56 as usage data the character string which corresponds to the bar code and is submitted by the reading device 66, which represents the container identifier, and the date supplied by the data processing device 11 and the time of capturing which is supplied by the data processing device 11.

Further, it captures via the interface 58 as identifier data the individual identifier of the uppermost value document of the stack, which individual identifier is submitted by the reading device 68.

For storing the usage data, the individual identifier corresponding to the identifier data is searched for in the individual identifiers for the various stacks, which are stored as belonging to a stack in memory portion 64. In this embodiment, the data processing device 11, more precisely, searches in the individual identifiers, which do not yet have usage data stored to be associated therewith, for the individual identifier captured for the uppermost value document of the stack. If it finds the individual identifier, it stores the usage data so as to be associated with the individual identifiers stored as belonging to a stack, among which there can also be found the found individual identifier. In this embodiment, this is effected in that the usage data are stored so as to be associated with the list. The individual identifiers of those value documents whose individual identifiers are stored as belonging to the same stack and among whom there can be found the individual identifier described by the identifier data and the usage data are thus stored so as to be directly associated with each other.

The last steps can now be repeated for further stacks and/or security containers.

If there is to be ascertained later, which value documents with which individual identifier were used for filling a security container, the data processing device 11 may capture the container identifier, for example via a corresponding input device like a keyboard, and after searching in the stored data records output the individual identifiers stored to be associated with the usage data with the container identifier and as belonging to a stack, optionally also outputting date and time, via an output device, for example a display device or a printer.

However, if there is to be ascertained later, how a value document having a specified individual identifier was used, in a method for identifying the usage of a value document with an individual identifier the data processing device 11 can read in the individual identifier, for example, by means of the mentioned input device and search for this among the individualization identifiers stored to be associated with usage data and as belonging to a stack by means of the method described above. If it finds the individual identifier, it ascertains the associated usage data and outputs them via the output device.

Other embodiments differ from the above-described embodiments in that instead of the individual identifier of the uppermost value document the individual identifier of any other value document of the stack is captured.

Yet other embodiments differ from the preceding embodiments in that at least a part of the usage data from the security container are read or are transmitted via a wireless interface. Instead of the USB interface 56, now an RFID reader is provided. The security containers now have instead of the bar code, or additionally to this, an RFID chip in which the container identifier is stored. The transmission of the container identifier is then effected via this interface.

Other embodiments differ from the above-described embodiments in that the data processing device 11 has an input device for the manual input of identifier data, in the example individual identifiers, and that these are captured by means of the input device, for example a keyboard.

Other embodiments differ from the above-described embodiments in that as a hand-held reading device there is used a simple camera with a WLAN interface. The hand-held reading device is configured for capturing a digital image of at least a portion of a value document having an individual identifier and for transmitting the image via the WLAN interface. Accordingly, the data processing device is modified to the effect that the interface 58 is replaced by a WLAN interface. The data processing is now configured to capture the digital image as identifier data via the WLAN interface and to ascertain the individual identifier from the image by means of the processor, which it then uses as in the above-described embodiments. For ascertaining the individual identifier from the identifier data there can be used, for example, the method which is also used by the value document processing apparatus 10.

Yet other embodiments differ from the preceding embodiments in that the value document processing apparatus comprises at least one bander, by means of which the stacks are banded before they are fed to a usage.

Yet further embodiments differ from the above-described embodiments in that the data processing device is integrated in the value document processing apparatus 10.

Other embodiments may differ from the above-described embodiments in that other sorting criteria are used. For example, alternatively, a sorting according to currency and/or denomination and/or authenticity may be effected.

Further, in further embodiments, the data processing device 11 may have a data base in which the individual identifiers stored as belonging to a stack and the usage data are stored to be associated with each other.

Furthermore, it is possible that in other embodiments the memory device 52 is omitted and the individual identifiers are transmitted directly to the data processing device and are stored there.

In other embodiments, instead of security containers there can be used other containers for value documents, in which value documents are kept for example only temporarily. These do not need to be configured as security containers, but can be open, so that a direct access to the value documents therein is possible.

The invention claimed is:

1. A method for processing value documents which have an individual identifier, comprising:

- transporting the value documents from an input pocket past a sensor device to an output device,
- capturing the individual identifier for each of the value documents using said sensor device,
- forming a first stack including at least a part of the value documents in said output device,
- storing in a memory device the individual identifier obtained for each of the value documents in the first stack so that it is indicated that each of said value documents in the first stack belongs to the first stack,
- capturing usage data for the first stack indicating a use for the first stack,
- capturing identifier data for the first stack, the identifier data representing the individual identifier of the uppermost value document in the first stack and identifying the first stack and the value documents belonging to the stack,
- using the identifier data for the first stack, storing the usage data for the first stack and the individual identifiers of the value documents of the first stack data in the memory device so that it is indicated that the value documents belong to the first stack.

2. The method according to claim 1, in which the usage data comprise a container identifier of a container for value documents of a security container, in which the first stack is or was loaded, and at least one date at which the first stack is or was loaded in the container.

3. The method according to claim 1, in which at least a part of the usage data are read or transmitted via a wired or wireless interface.

4. The method according to claim 1, in which the identifier data are captured by means of an input device for the manual input of identifier data.

5. The method according to claim 1, in which the identifier data are captured by means of a reading device.

6. The method according to claim 5, in which the identifier data comprise image data for an image of the individual identifier, and the individual identifier is ascertained from the identifier data by means of a processor of a data processing device in which the usage data and individualization data are stored.

7. The method according to claim 1, in which for various further stacks individual identifiers are respectively stored as belonging to a stack, and for storing the usage data, the individual identifier corresponding to the identifier data are searched for in the individual identifiers for the stack and the further stacks, which are stored as belonging to a stack.

8. The method according to claim 1, in which the individual identifiers of those value documents whose individual identifiers are stored as belonging to the same stack and which include the individual identifier described by the identifier data and the usage data are stored so as to be directly associated with each other.

9. A method for identifying the usage of a value document with an individual identifier, in which the individual identifier is read in and is searched for among the individualization identifiers that are associated with usage data, and stored as belonging to a stack and stored by means of a method according to claim 1, and, if the individual identifier is found, associated usage data are ascertained.

10. A data processing device, comprising

- one or more interfaces arranged to capture individual identifiers of value documents, which are transmitted as belonging to a first stack, usage data with the help of which the usage of the first stack is identifiable, and identifier data of the first stack which comprises an individual identifier of an uppermost value document in the first stack;

a memory device arranged to store the usage data of the first stack of value documents and the identifier data of the first stack of value documents; and one or more processors controlling the one or more interfaces and the memory device;

wherein the memory device stores the individual identifiers of the value documents transmitted as belonging to a first stack in such a way that it is indicated that the value documents belong to the first stack, and wherein the memory device stores the identifier data of the first stack, the usage data and the individual identifiers of the value documents in the first stack so as to be associated with each other.

11. An apparatus for processing value documents having an individual identifier with a feeding device for feeding value documents, an output device for outputting processed value documents, which has at least pocket for a stack of processed value documents, a transport device for transporting singled value documents along a transport path from the feeding device to the output device, at least one sensor device arranged at the transport path for capturing the individual identifier of a transported value document, and a control and evaluation device which is configured to capture the individual identifiers of the value documents stacked in the output pocket, and a data processing device according to claim 10.

12. The data processing device according to claim 10, in which the usage data comprise a container identifier of a container for value documents of a security container, in which the stack is or was loaded, and at least one date at which the stack is or was loaded in the container.

13. The data processing device according to claim 10, having a wired or wireless interface configured such that at least a part of the usage data are read or received via the wired or wireless interface.

14. The data processing device according to claim 10, having an input device for the manual input of identifier data and configured such that the identifier data are captured by means of the input device for the manual input of identifier data.

15. The data processing device according to claim 10, having a reading device configured such that the identifier data are read via the interface from the reading device.

16. The data processing device according to claim 10, in which the identifier data captured by the one or more interfaces and stored by the memory device comprises image data for an image of the individual identifier and wherein the individual identifier is ascertained from the identifier data.

17. The data processing device according to claim 10, wherein the memory device stores additional individual identifiers as belonging to various further stacks for storing usage data of the various further stacks, and the one or more processors are configured to search the memory device for the individual identifier, corresponding to the identifier data, in the individual identifiers for the first stack and the additional individual identifiers belonging to the various further stacks, which are stored as belonging to a stack.

18. The data processing device according to claim 10, wherein the memory device is configured to store the individual identifiers of those value documents belonging to the same stack so as to be directly associated with each other.

19. The method according to claim 1, in which the individual identifier obtained for each of the value documents in the first stack is stored together in a list associated with the first stack.

20. The method according to claim 1, in which the individual identifier obtained for each of the value documents in the first stack is stored with a stack identifier, which identifies the first stack.

* * * * *